(12) United States Patent
Zeppenfeld et al.

(10) Patent No.: US 8,903,859 B2
(45) Date of Patent: Dec. 2, 2014

(54) SYSTEMS, METHODS, AND MEDIA FOR GENERATING HIERARCHICAL FUSED RISK SCORES

(75) Inventors: Torsten Zeppenfeld, Emerald Hills, CA (US); N. Nikki Mirghafori, Berkeley, CA (US); Lisa Guerra, Los Altos, CA (US); Richard Gutierrez, San Jose, CA (US); Anthony Rajakumar, Fremont, CA (US)

(73) Assignee: Verint Americas Inc., Alpharetta, GA (US)

( * ) Notice: Subject to any disclaimer, the term of this patent is extended or adjusted under 35 U.S.C. 154(b) by 46 days.

(21) Appl. No.: 13/415,816

(22) Filed: Mar. 8, 2012

(65) Prior Publication Data
US 2012/0254243 A1   Oct. 4, 2012

Related U.S. Application Data

(63) Continuation-in-part of application No. 13/290,011, filed on Nov. 4, 2011, which is a continuation-in-part of application No. 11/754,974, filed on May 29, 2007, now Pat. No. 8,073,691, which is a continuation-in-part of application No. 11/754,975,
(Continued)

(51) Int. Cl.
| | |
|---|---|
| *G06F 17/30* | (2006.01) |
| *H04W 12/12* | (2009.01) |
| *H04M 15/00* | (2006.01) |
| *G10L 17/00* | (2013.01) |
| *G10L 25/48* | (2013.01) |

(52) U.S. Cl.
CPC .............. *H04M 15/47* (2013.01); *G10L 17/00* (2013.01); *H04W 12/12* (2013.01); *G10L 25/48* (2013.01)
USPC .................. 707/780; 707/776; 707/E17.041; 707/E17.102

(58) Field of Classification Search
USPC ........... 379/88.02, 114.14, 144.03, 145, 189; 705/38; 707/778, 776, 780, E17.041, 707/E17.102
See application file for complete search history.

(56) References Cited

U.S. PATENT DOCUMENTS

| | | |
|---|---|---|
| 4,653,097 A | 3/1987 | Watanabe et al. |
| 5,805,674 A | 9/1998 | Anderson, Jr. |

(Continued)

FOREIGN PATENT DOCUMENTS

| | | |
|---|---|---|
| EP | 0598469 | 5/1994 |
| JP | 2006038955 | 9/2006 |

(Continued)

OTHER PUBLICATIONS

Final Office Action, Oct. 7, 2013, U.S. Appl. No. 12/352,530, Jan. 12, 2009.

(Continued)

*Primary Examiner* — Duc Nguyen
*Assistant Examiner* — Yosef K Laekemariam
(74) *Attorney, Agent, or Firm* — Meunier Carlin & Curfman

(57) ABSTRACT

Systems, methods, and media for generating fused risk scores for determining fraud in call data are provided herein. Some exemplary methods include generating a fused risk score used to determine fraud from call data by generating a fused risk score for a leg of call data, via a fuser module of an analysis system, the fused risk score being generated by fusing together two or more uniquely calculated fraud risk scores, each of the uniquely calculated fraud risk scores being generated by a sub-module of the analysis system; and storing the fused risk score in a storage device that is communicatively couplable with the fuser module.

19 Claims, 5 Drawing Sheets

Related U.S. Application Data filed on May 29, 2007, now abandoned, which is a continuation-in-part of application No. 12/352,530, filed on Jan. 12, 2009, which is a continuation-in-part of application No. 12/856,200, filed on Aug. 13, 2010, which is a continuation-in-part of application No. 12/856,118, filed on Aug. 13, 2010, which is a continuation-in-part of application No. 12/856,037, filed on Aug. 13, 2010, now Pat. No. 8,510,215, which is a continuation-in-part of application No. 11/404,342, filed on Apr. 14, 2006, which is a continuation-in-part of application No. 13/278,067, filed on Oct. 20, 2011, now Pat. No. 8,311,826, which is a continuation-in-part of application No. 13/415,809, filed on Mar. 8, 2012.

(60) Provisional application No. 60/923,195, filed on Apr. 13, 2007, provisional application No. 60/808,892, filed on May 30, 2006, provisional application No. 61/197,848, filed on Oct. 31, 2008, provisional application No. 61/010,701, filed on Jan. 11, 2008, provisional application No. 61/335,677, filed on Jan. 11, 2010, provisional application No. 60/673,472, filed on Apr. 21, 2005.

(56) References Cited

U.S. PATENT DOCUMENTS

| | | | |
|---|---|---|---|
| 5,999,525 | A | 12/1999 | Krishnaswamy et al. |
| 6,044,382 | A | 3/2000 | Martino |
| 6,145,083 | A | 11/2000 | Shaffer et al. |
| 6,266,640 | B1 | 7/2001 | Fromm |
| 6,427,137 | B2 | 7/2002 | Petrushin |
| 7,039,951 | B1 | 5/2006 | Chaudhari et al. |
| 7,212,613 | B2 | 5/2007 | Kim et al. |
| 7,386,105 | B2 * | 6/2008 | Wasserblat et al. ...... 379/114.14 |
| 7,539,290 | B2 | 5/2009 | Ortel |
| 7,657,431 | B2 | 2/2010 | Hayakawa |
| 7,668,769 | B2 | 2/2010 | Baker et al. |
| 7,778,832 | B2 | 8/2010 | Broman et al. |
| 7,822,605 | B2 | 10/2010 | Zigel et al. |
| 7,908,645 | B2 | 3/2011 | Varghese et al. |
| 7,940,897 | B2 | 5/2011 | Khor et al. |
| 8,036,892 | B2 | 10/2011 | Broman et al. |
| 8,112,278 | B2 | 2/2012 | Burke |
| 2001/0026632 | A1 | 10/2001 | Tamai |
| 2002/0099649 | A1 | 7/2002 | Lee et al. |
| 2003/0208684 | A1 | 11/2003 | Camacho et al. |
| 2004/0029087 | A1 | 2/2004 | White |
| 2004/0131160 | A1 | 7/2004 | Mardirossian |
| 2004/0240631 | A1 | 12/2004 | Broman et al. |
| 2005/0043014 | A1 | 2/2005 | Hodge |
| 2005/0125226 | A1 | 6/2005 | Magee |
| 2005/0125339 | A1 | 6/2005 | Tidwell et al. |
| 2005/0185779 | A1 | 8/2005 | Toms |
| 2006/0106605 | A1 | 5/2006 | Saunders et al. |
| 2006/0161435 | A1 | 7/2006 | Atef et al. |
| 2006/0212407 | A1 | 9/2006 | Lyon |
| 2006/0212925 | A1 * | 9/2006 | Shull et al. ...................... 726/1 |
| 2006/0248019 | A1 | 11/2006 | Rajakumar |
| 2006/0282660 | A1 | 12/2006 | Varghese et al. |
| 2006/0289622 | A1 | 12/2006 | Khor et al. |
| 2006/0293891 | A1 | 12/2006 | Pathuel |
| 2007/0041517 | A1 | 2/2007 | Clarke et al. |
| 2007/0074021 | A1 | 3/2007 | Smithies et al. |
| 2007/0280436 | A1 | 12/2007 | Rajakumar |
| 2007/0282605 | A1 | 12/2007 | Rajakumar |
| 2008/0010066 | A1 | 1/2008 | Broman et al. |
| 2008/0195387 | A1 * | 8/2008 | Zigel et al. ...................... 704/236 |
| 2009/0046841 | A1 | 2/2009 | Hodge |
| 2009/0119106 | A1 | 5/2009 | Rajakumar et al. |
| 2009/0147939 | A1 | 6/2009 | Morganstein et al. |
| 2009/0254971 | A1 | 10/2009 | Herz et al. |
| 2010/0228656 | A1 | 9/2010 | Wasserblat et al. |
| 2010/0303211 | A1 | 12/2010 | Hartig et al. |
| 2010/0305946 | A1 | 12/2010 | Gutierrez et al. |
| 2010/0305960 | A1 | 12/2010 | Gutierrez et al. |
| 2011/0191106 | A1 | 8/2011 | Khor et al. |
| 2011/0255676 | A1 | 10/2011 | Marchand et al. |
| 2012/0072453 | A1 | 3/2012 | Guerra et al. |
| 2012/0253805 | A1 | 10/2012 | Rajakumar et al. |
| 2012/0263285 | A1 | 10/2012 | Rajakumar et al. |
| 2013/0253919 | A1 | 9/2013 | Gutierrez et al. |

FOREIGN PATENT DOCUMENTS

| | | |
|---|---|---|
| WO | 0077772 | 12/2000 |
| WO | 2006013555 | 2/2006 |
| WO | 2007001452 | 1/2007 |

OTHER PUBLICATIONS

Office Action, Aug. 23, 2013, U.S. Appl. No. 12/856,118, Aug. 13, 2010.

Office Action, Oct. 18, 2013, U.S. Appl. No. 13/415,816, Mar. 8, 2012.

* cited by examiner

SYSTEMS, METHODS, AND MEDIA FOR GENERATING HIERARCHICAL FUSED RISK SCORES

CROSS-REFERENCE TO RELATED APPLICATIONS

This application is a continuation-in-part and claims benefit of and priority to U.S. patent application Ser. No. 13/290,011, filed on Nov. 4, 2011, entitled "SYSTEMS, METHODS, AND MEDIA FOR DETERMINING FRAUD PATTERNS AND CREATING FRAUD BEHAVIORAL MODELS," which is a continuation-in-part of U.S. patent application Ser. No. 11/754,974, (now U.S. Pat. No. 8,073,691) filed on May 29, 2007, entitled "METHOD AND SYSTEM FOR SCREENING USING VOICE DATA AND METADATA," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006, entitled "Optimizations for a Fraud Detection System that uses Voiceprints."

This application is also a continuation-in-part and claims benefit of and priority to U.S. patent application Ser. No. 11/754,975, filed on May 29, 2007, entitled "Method and System to Seed a Voice Database," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006, entitled "Optimizations for a Fraud Detection System that uses Voiceprints."

This application is also a continuation-in-part and claims benefit of and priority to U.S. patent application Ser. No. 12/352,530, filed on Jan. 12, 2009, entitled "BUILDING WHITELISTS COMPRISING VOICEPRINTS NOT ASSOCIATED WITH FRAUD AND SCREENING CALLS USING A COMBINATION OF A WHITELIST AND BLACKLIST," which in turn claims the benefit of and priority to U.S. Provisional Applications 61/197,848, filed Oct. 31, 2008, entitled "Voice biometrics based fraud management system," and 61/010,701, filed Jan. 11, 2008, entitled "Optimizations & extensions of a system to detect fraud using voiceprints."

This application is also a continuation-in-part and claims benefit of and priority to U.S. patent application Ser. No. 12/856,200, filed on Aug. 13, 2010, entitled "SPEAKER VERIFICATION-BASED FRAUD SYSTEM FOR COMBINED AUTOMATED RISK SCORE WITH AGENT REVIEW AND ASSOCIATED USER INTERFACE," which in turn claims the benefit of and priority to U.S. Provisional Application 61/335,677, filed on Jan. 11, 2010, entitled "Method for correlating fraud audio to textual fraud reports using word spotting."

This application is also a continuation-in-part and claims benefit of and priority to U.S. patent application Ser. No. 12/856,118, filed on Aug. 13, 2010, entitled "METHOD AND SYSTEM FOR GENERATING A FRAUD RISK SCORE USING TELEPHONY CHANNEL BASED AUDIO AND NON-AUDIO DATA," which in turn claims the benefit of and priority to U.S. Provisional Applications 61/335,677, filed on Jan. 11, 2010, entitled "Method for correlating fraud audio to textual fraud reports using word spotting."

This application is also a continuation-in-part and claims benefit of and priority to U.S. patent application Ser. No. 12/856,037, filed on Aug. 13, 2010, entitled "METHOD AND SYSTEM FOR ENROLLING A VOICEPRINT IN A FRAUDSTER DATABASE," which in turn claims the benefit of and priority to U.S. Provisional Applications 61/335,677, filed on Jan. 11, 2010, entitled "Method for correlating fraud audio to textual fraud reports using word spotting."

This application and each of the aforementioned Non-Provisional U.S. patent Applications is a continuation-in-part and claims benefit of and priority to U.S. patent application Ser. No. 11/404,342, filed on Apr. 14, 2006, entitled "Method and system to detect fraud using voice data," which in turn claims the benefit of U.S. Provisional Application 60/673,472, filed on Apr. 21, 2005, entitled "Detecting Fraudulent Use of Financial Account Numbers Using Voiceprints."

This application is also a continuation-in-part and claims the benefit of and priority to U.S. patent application Ser. No. 13/278,067, filed on Oct. 20, 2011, entitled "Method and System for Screening Using Voice Data and Metadata," which in turn is a continuation of and claims the benefit of and priority to U.S. patent application Ser. No. 11/754,974, filed on May 29, 2007, entitled "METHOD AND SYSTEM FOR SCREENING USING VOICE DATA AND METADATA," which in turn claims the benefit of and priority to U.S. Provisional Applications 60/923,195, filed on Apr. 13, 2007, entitled "Seeding Techniques and Geographical Optimization Details for a Fraud Detection System that uses Voiceprints," and 60/808,892, filed on May 30, 2006, entitled "Optimizations for a Fraud Detection System that uses Voiceprints."

This application is also a continuation-in-part and claims benefit of and priority to U.S. patent application Ser. No. 13/415,809, filed concurrently herewith on Mar. 8, 2012, entitled "SYSTEMS, METHODS, AND MEDIA FOR DETERMINING FRAUD RISK FROM AUDIO SIGNALS." All of above applications and patents are hereby incorporated by reference herein in their entirety.

FIELD OF THE TECHNOLOGY

Embodiments of the disclosure relate to methods and systems for generating risk scores for call data within the context of fraud detection systems. The technologies provided herein may be utilized to generate fused risk scores from multiple unique risk scores that are generated by various modules of a fraud analysis system.

BACKGROUND

Fraud such as credit card fraud and identity fraud are common. To deal with fraud, enterprises such as merchants and banks use a variety of fraud detection systems that analyze call data and determine if the call data is associated with fraudsters. However, these fraud detection systems are susceptible to becoming obsolete within a short time because fraudsters change their methods of perpetrating fraud in order to maneuver past such fraud detection systems.

Therefore, what is needed are systems, methods, and media for generating risk scores that may be utilized by call center agents to determine the risk level associated with one or more instances of call data.

SUMMARY

According to some embodiments, the present technology may be directed to methods for generating a fused risk score used to determine fraud from call data. The methods may include: (a) generating a fused risk score for a leg of call data, via a fuser module of an analysis system, the fused risk score being generated by fusing together two or more uniquely calculated fraud risk scores, each of the uniquely calculated fraud risk scores being generated by a sub-module of the analysis system; and (b) storing the fused risk score in a storage device that is communicatively couplable with the fuser module.

According to some embodiments, the present technology may be directed to a method for generating a fused risk score used to determine a likelihood of fraud from call data. The method may include: (including any amendments made during the pendency of this application and all equivalents of those claims as issued) receiving a first leg of call data, generating a first audio component match score for the first leg of the call data based on a comparison of audio data in the first leg with a first voice model in a fraudster database using a first component of a first sub-module and generating a first non-audio component match score for the first leg of the call data based on a comparison of non-audio data in the first leg with a first non-audio data in the fraudster database using a second component of the first sub-module. The method further includes fusing together the first audio component match score and the first non-audio component match score using a first fuser component to generate a first fused component match score. The method also includes determining the fused risk score based on the first fused component match score using a risk score fuser module and determining the likelihood of fraud from the fused risk score.

According to some embodiments, the present technology may be directed to a system for generating a fused risk score from call data. The system includes a memory for storing executable instructions, a processor for executing the instructions, and a first blacklist sub-module configured to receive a first leg of call data, the first blacklist sub-module. The first blacklist sub-module includes a voice data component configured to generate a blacklist voice match score based on a comparison of voice call data and a speaker model in a fraudster database, a non-audio data component configured to generate a blacklist non-audio match score based on a comparison of non-audio call data and a fraudster non-audio model in the fraudster database, the fraudster non-audio model related to the fraudster speaker model and a blacklist fuser component communicatively coupled to the voice data component and the non-audio data component and configured to fuse the blacklist voice match score and the blacklist non-audio match score and output a blacklist match score. The system further includes a first whitelist sub-module configured to receive the first leg of the call data, the first whitelist sub-module. The first whitlist sub-module includes a voice data component configured to generate a whitelist voice match score based on a comparison of voice call data and a speaker model in a whitelist database, a non-audio data component configured to generate a whitelist non-audio match score based on a comparison of non-audio call data and a whitelist non-audio model in a whitelist database the whitelist non-audio model related to the whitelist speaker model, and a whitelist fuser component communicatively coupled to the voice data component and the non-audio data component and configured to fuse the whitelist voice match score and the whitelist non-audio match score and output a whitelist match score. The system also includes a first fuser sub-module configured to fuse the blacklist match score and whitelist match score for the first leg of the call data and generate a first leg risk score.

According to some embodiments, the present technology may be directed to systems for generating a fused risk score used to determine fraud from call data. The systems may include: (a) a memory for storing executable instructions; (b) a processor for executing the instructions; (c) two or more sub-modules that each generate uniquely calculated fraud risk scores for a leg of call data; (d) a fuser module stored in memory and executable by the processor to generate a fused risk score for the leg of call data, the fuser module generating the fused risk score by fusing together two or more uniquely calculated fraud risk scores; and (e) an output module that stores the fused risk score in a storage device that is associated with the analysis system.

According to additional embodiments, the present technology may be directed to computer readable storage media for generating a fused risk score. The storage media may include a program embodied thereon, the program being executable by a processor to perform a method for generating a fused risk score used to determine fraud from call data. The method may include: (a) generating a fused risk score for a leg of call data, via a fuser module of an analysis system, the fused risk score being generated by fusing together two or more uniquely calculated fraud risk scores, each of the uniquely calculated fraud risk scores being generated by a sub-module of the analysis system; and (b) storing the fused risk score in a storage device that is communicatively couplable with the fuser module.

According to other embodiments, the present technology may be directed to methods for processing call data utilizing a fused risk score. The methods may include: (a) generating a fused risk score for a leg of call data, via a fuser module of an analysis system, the fused risk score being generated by fusing together two or more uniquely calculated fraud risk scores, each of the uniquely calculated fraud risk scores being generated by a sub-module of the analysis system; (b) comparing the fused risk score to a threshold value; and (c) storing the call data in at least one of a whitelist, a blacklist, and a precursor database in response to the comparison.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
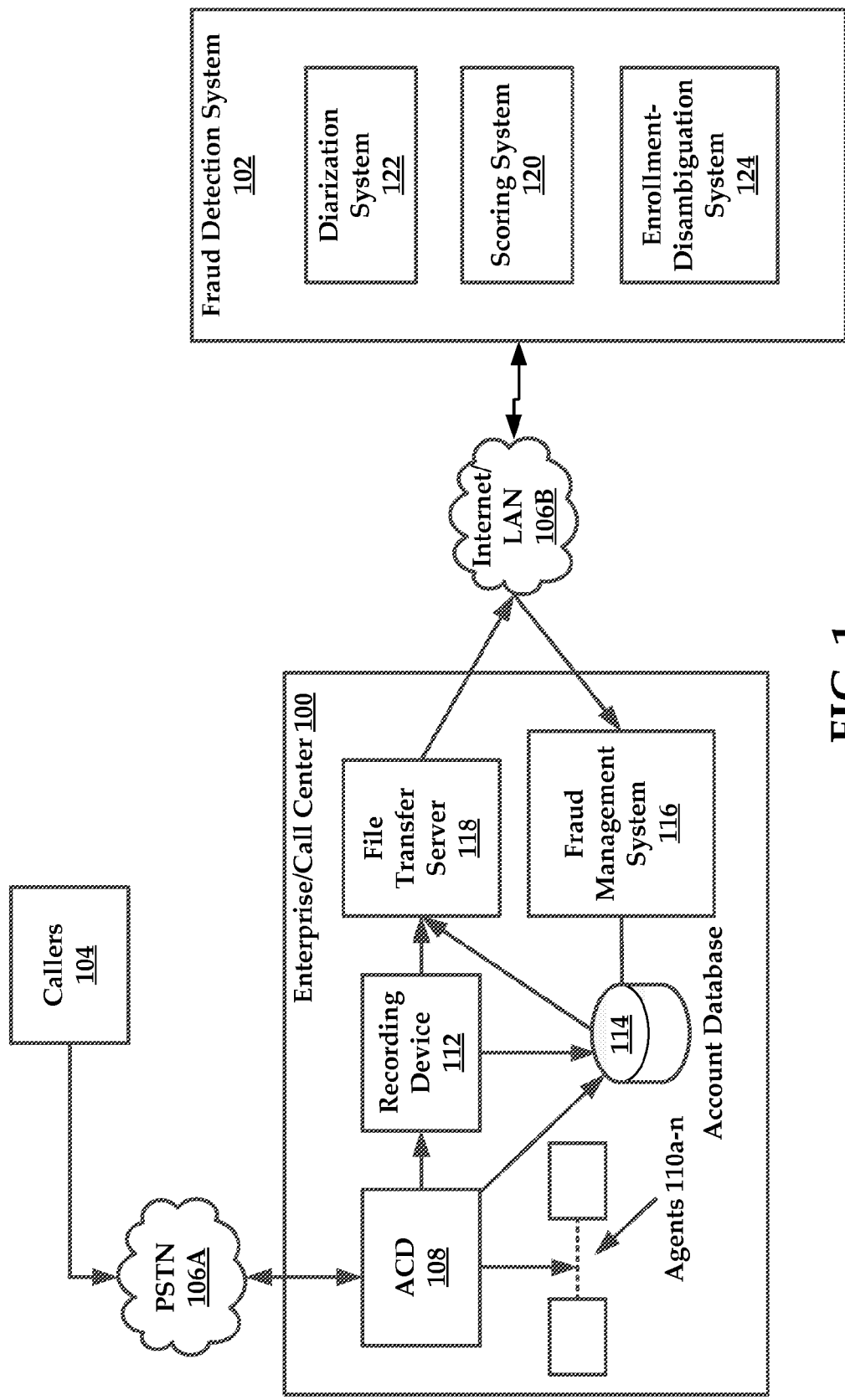
FIG. 1 illustrates a pictorial representation of an exemplary implementation of a system for fraud detection.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Broadly speaking, the present technology may generate fused risk scores from call data. These fused risk scores may be utilized to determine fraud associated with call data. The present technology may generate fused risk scores from uniquely calculated risk scores generated by sub-modules of an analysis system. Stated succinctly, a fused risk score may represent the coalescence of various fraud indicators (or risk scores) into a single, fused score or a plurality of fused scores. Thus, otherwise disparate risk scores or risk values may be analyzed together to determine fraud from call data in a manner that is unavailable from evaluating these individual risk scores or risk values alone.

This fused risk score may be utilized as the basis to take specific action relative to call data, such as enrolling the call data into a fraudster database (e.g., blacklist), enrolling the call data into a customer database (e.g., whitelist), flagging the call data for review, approving/denying a transaction, and so forth.

According to some embodiments, the manner in which a fused risk score is calculated may be specified by requirements established by an enterprise. For example, a bank may elect to have certain types of risk scores fused into one or more fused risk scores by the present technology. As such, a subset of risk scores generated by sub-modules may be combined into a particularized risk score that is highly relevant to the business needs of the enterprise.

The present technology may receive call data from a call data source, such as a call data recording system of an enterprise, or directly from a caller. In some instances, the call data may be diarized to separate the call data into legs. Advantageously, each leg may comprise voice data, channel data, and other data (such as operational data) associated with the voice data or the channel data, for a single speaker. Therefore, for each unique speaker in the call data, a leg of call data may be created.

The system may remove call data associated with agents via comparative processes that compare the voice data (such as speaker models) in the legs of call data to agent voice data. It will be understood that the terms "voice data" may be understood to include raw voice data and/or a speaker model generated from the raw voice data.

Legs of call data associated with agents may be filtered out, while the remaining legs (e.g., legs that may be potentially associated with fraudsters or customers) may be processed to generate fused risk scores for each of the remaining legs. These fused risk scores may be utilized to indicate a relative risk level for a particular leg of call data. In some instances, fused risk scores for individual legs may also be fused together to create a fused risk score for the call data, rather than just individual legs of the call data. On the other hand, fused risk scores may be generated on a more granular level. For example, a fused risk score may be generated for a sub-module by combining the individual outputs of components within the sub-module, as will be described in greater detail below.

Generally speaking, the risk score for a call event may represent the likelihood that a call event is associated with an instance of fraud, or even a particular fraudster. For example, a number between 0 and 1000 may be generated by the scoring module (such as the scoring system 120 in FIGS. 2A and 2B); the higher the number, the higher the risk. The scoring system 120 may employ any of a variety of functions for computing the risk score. One example is the likelihood function. In some embodiments a likelihood function is defined as the likelihood that a particular candidate call is fraud, or the likelihood that a particular candidate call is a specific fraudster, etc. The risk score may be used to evaluate not only the call audio data (e.g., audio signals, speaker models, channel models, etc.) but also non-audio data such as account, transactional, order, or other call related records.

The present technology may weigh individual risk scores or fused risk scores generated for sub-modules to optimize the determination of fraudsters from the legs of call data. In other embodiments, risk scores generated by individual components of the sub-modules may also be fused. Therefore, fusing of risk scores may occur on several levels within an analysis of call data.

In some instances the present technology may employ a controller that exposes a leg of call data to sub-modules in a hierarchical manner. That is, a leg of call data may be selectively processed in a sequential or otherwise ordered manner by two or more sub-modules. After each stage of processing (e.g., generation of a risk score), the output of a sub-module may be utilized as the basis to determine if the leg is to be exposed to one or more additional modules. For example, if the initial sub-module generates a risk score for the leg that indicates that the leg is a perfect match with an ANI (automatic number identification) associated with a fraudster, it may not be necessary to subsequently process the call data with other sub-modules. Other types of gating functions such as this may be employed to increase the efficiency of the present technology.

Additionally, the fused risk scores may serve as the basis for determining how call data is further processed. For example, a fused risk score may indicate that a leg is highly likely associated with a fraudster. Therefore, the leg may be enrolled into a fraudster database. In other embodiments, the fused risk score may serve as the basis for storing the leg in a precursor database, or the flagging the leg for further review. In some instances, a fused risk score may prompt the communication of an alert communication, and/or the acceptance/declination of a particular transaction.

A fused risk score may prompt the generation of various types of output, which may be generated by various components of the present technology. For example, based upon a fused risk score, the present technology may output a single overall fused risk score for call data, confidence values for one or more of the aforementioned fused risk scores, a reason code associated with a fused risk score (or multiple codes), diarized call data (along with confidence values for the diarization), along with other types of output that would be known to one of ordinary skill in the art with the present disclosure before them.

These and other advantages of the present technology are described infra with reference to the collective drawings, FIGS. 1-4.

Referring now to FIG. 1, a pictorial representation of an exemplary implementation of a system for fraud detection is shown, in accordance with various embodiments of the present disclosure. As can be seen from FIG. 1, an enterprise call center 100, a fraud detection system (hereinafter referred to as "FDS 102," and a plurality of callers 104 are shown. The call center 100 may receive and process calls on behalf of an enterprise. The enterprise may include a merchant, an insurance company, an affiliate of a company, a bank, a telecommunication company, a cellular service provider, a credit card company, a credit card service company, and the like.

According to some embodiments, the call center 100 may receive calls from the plurality of callers 104 (hereinafter "the callers 104") for goods and/or services provided by the enterprise. The callers 104 may call the call center 100 using a VoIP/Public Switched Telephone Network (PSTN)/mobile network 106A. The calls from the callers 104 may enter an automatic call distributor 108, which distributes calls across individual agents 110a-n. Call events may be recorded by a recording device 112 of the call center 100 and later processed for fraud detection. It will be understood that the callers 104 may include legitimate customers and fraudsters.

The callers 104 may request call center agents (who receive phone calls) to process transactions related to goods/services. In some embodiments, the call center 100 may apply one or more business rules to decide whether to process a transaction directly or to have a fraud check performed on the caller. The term "call data" for a call event or a segment of the call event may be understood to include not only audio data (e.g., audio signals, or call audio data) for the call event, but non-audio data for the call event. The term "call audio data" for the call event or segment of the call event may be understood to include the audio portion of the call data (e.g., audio signals). "Call audio data," "audio sample," "audio signal," and "audio data" may be used interchangeably. The above-described examples of audio signal data are to be understood to be non-limiting, and one of ordinary skill in the art will appreciate that many other types of audio signal may likewise be utilized in accordance with the present technology. Additionally, audio information or data may be extracted from call audio data including both speaker models that represent the voice of a speaker and channel models that represent a communication profile of an audio path for a channel used by the speaker. The communications profile may include noise models, background noise, transfer path functions (as will be described in greater detail infra), as well as other representative characteristics that may be determined for a communications channel that would be known to one of ordinary skill in the art.

Many touchpoints may exist for exchanging data between an enterprise and a customer. For example, the enterprise may operate physical establishments, call centers, websites, physical mail, short messaging services, mobile applications, and so forth. Enterprises may not utilize systems that employ consolidated records for customers that link data gathered from these various touchpoints.

Additional examples of non-audio data include in various combinations a call identification that includes a unique identifier that identifies the call, an automatic number identification that represents the number that initiated a call event, a dialed number identification service that comprises a dialed number (e.g., telephone number, short code, etc.), an agent identification that specifies the call agent associated with the call event, a queue identifier that identifies the telephony queue into which a call event has been directed by the call center 100 (e.g., sales, technical support, fraud review, etc.), a timestamp that indicates a date and time when the call event was initiated, a call center identifier that indicates the call center which initially received the call event, and/or the like.

For a call in reference to an account and/or transaction, examples of non-audio data include an account number that specifies the account number that the call event was in reference to, a transaction number that specifies a transaction that the call was in reference to, names associated with the account (first, last, etc), a social security number or other government issued identification number, an address (current and/or previous), telephone number (current and/or previous), email address, account type (business, consumer, reseller, etc.), account opening date, credit limit, list of transactions associated with the account.

Examples of transaction non-audio data include a transaction identifier that uniquely identifies the transaction, a timestamp specifying a date and time for the transaction, a transaction disposition (e.g., change of address, account balance check, account payment details, account plan change, and so forth), a shipping address, and combinations thereof.

For a call in reference to an order, examples of non-audio data include an order number such as a unique order identification, a list of items ordered, an order value, a timestamp, a name, a shipping address, an email address, a phone number, a shipping method, billing details, and combinations thereof. Any of the above non-audio data may be used as an audio signal identifier.

All of the aforementioned types of data including audio and/or non-audio data may be employed to generate risk scores for a call event, as will be described in greater detail infra.

Many types of customer metadata may be determined from an evaluation of the above mentioned call data. Exemplary types of metadata include account, transaction, and/or order metadata, along with call metadata. Additional data may also be extracted from non-audio data, such as patterns or relationships.

Additionally, audio data (e.g., a leg) extracted from call data may include speaker data from which a speaker model may be generated, as well as channel data from which a channel model may be generated representing a communications profile for a channel used by the speaker.

A channel model may include information regarding the path that was traversed by an audio sample (e.g., the path between the caller and the caller agent or enterprise system). The present technology may evaluate and model the delay present in the audio signal to characterize the path taken by the audio signal. In addition to modeling delay, the present technology may model jitter, echo, artifacts (such as artifacts introduced by audio compression/encoding techniques), error recovery, packet loss, changes to the signal bandwidth, spectral characteristics, and/or other audio artifacts that occur at switching boundaries. With particular regard to VoIP paths, discrete devices (e.g., routers, gateways, servers, computing devices, etc.) involved in the transmission of VoIP data may also imprint artifacts in an audio sample. The channel model also can model handset characteristics such as microphone type.

It will be understood that the channel characteristics for a segment of call audio data may be sufficiently unique to determine that separate segments of call audio data belong to two separate speakers. For example, a customer calling into an enterprise may have channel characteristics that are inherently distinctive relative to the channel characteristics associated with call agents of the enterprise. Therefore, differences in channel characteristics may alone suffice as a basis for diarizing and separating segments of call audio data.

The present technology may also generate operational models for call data that represent non-audio related information comprising data such as aliases/names utilized, ANIs used, geographical area of operation (e.g., shipping address, zipcode, etc.), fraudulent activities, and so forth. The operational models may include many types of speaker agnostic data. Speaker agnostic data may include types of data that do not depend upon the actual words spoken by a particular caller.

The term "speaker model" may be understood to include a voice model representing the unique characteristics of an individual's voice, and/or a language model representing linguistic characteristics of the speaker. The voice model may include a collection of features that are extracted from an audio signal, of the individual's voice, and encoded within a specific statistical framework. In various embodiments, these features include cadence, tone, rate of speech, spectral characteristics, and/or other descriptive information about the voice and vocal track of the speaker that describes the speaker (separately from the words spoken). Other synonyms for a voice model may include, but are not limited to, a voice signature, a voice print, a voice portion of a speaker model, and also in some instances, simply a speaker voice. The language model is comprised of features or characteristics (such as the words spoken and speech choices made by the speaker) and a statistical framework for encoding those features. Examples of a statistical framework include the probability of an occurrence of a string of words, and how that probability is calculated. In various embodiments, the language model includes language(s) spoken, word choice, word order, accent, grammar, diction, slang, jargon, rate of speech, and/or the like. It is noteworthy that in some instances information in addition to a speaker model (voice model and language model) can be extracted from call audio data. For example, a channel model may be extracted from call audio data, as described elsewhere herein. Further, word spotting or word recognition may be used to extract data, for example, name, account number, social security number, address, and/or the like from call audio data.

The present technology may compare voice data and/or channel data to fraudster models that are stored in a fraudster database. The fraudster model may comprise any combination of a speaker model, a channel model, and an operational model for a given fraudster. The operational model for a fraudster may comprise data such as aliases/names utilized, ANIs used, geographical area of operation (e.g., shipping address, zipcode, etc.), fraudulent activities, and so forth. Each fraudster may be associated with a fraud identifier that uniquely identifies a fraudster and allows the fraudster to be tracked.

In other embodiments, the present technology may also enroll speaker models (including voice models) determined to correspond to a fraudster in a blacklist determined to be associated with fraudsters. For additional details regarding the enrollment of speaker models into a blacklist see, e.g., U.S. patent application Ser. Nos. 11/404,342, 11/754,974, 11/754,975, 12/352,530, 12/856,037, 12/856,118, 12/856,200, which are all hereby incorporated by reference herein in their entireties.

Customer accounts for each legitimate customer may be stored in an account database 114. Additionally, call data for call events may be stored in the account database 114 or may be linked to the customer account via a screening identification that associates a particular call event with a customer account. Therefore, both legitimate and fraudulent call data events may be linked to the customer account.

In some embodiments, the call center 100 may include a fraud management system 116 that receives data indicative of potential or actual fraudulent activities from the FDS 102. The fraud management system 116 may utilize the fraud data provided by the FDS 102, along with other enterprise-specific information, to process and remedy fraudulent account activity.

A file transfer server 118 of the call center 100 may communicate recorded call data to the FDS 102 using Internet/LAN 106B. In some instances the audio signals may be streamed to the FDS 102 via the file transfer server 118. The Internet/LAN 106 may utilize a secure communications protocol. File transfer server 118 may communicate call data to a scoring system, hereinafter "system 120" via an application programming interface ("API") or any other suitable data transmission protocols, which may be secured or insecure. The scoring system 120 is configured to generate risk scores and fused the risk scores for use in detecting fraud. Additional operational details of the system 120 are described in greater detail with regard to FIGS. 2A and 2B.

It will be understood that the FDS 102 may be configured to receive fraud risk scores from the scoring system 120 for use to detect any type of fraud; however, for the purposes of brevity, the present disclosure focuses on fraud perpetrated fraudsters utilizing telephonic devices. The FDS 102 of FIG. 1 includes a scoring system 120, a diarization system 122 and an enrollment-disambiguation system 124.

The enrollment-disambiguation system 124 may enroll speaker models in a fraudster database/blacklist creates a fraudster database that may be used as a corpus of fraudster models that may be queried against for comparing voice data of a leg of call data to fraudster models for known fraudsters. More specifically, the present technology may compare voice data and/or channel data for an instance of call data (e.g., diarized leg of call data) to fraudster models that are stored in a fraudster database. The fraudster model may comprise any combination of a speaker model, a channel model, and an operational model for a given fraudster. The operational model for a fraudster may comprise data such as aliases/names utilized, ANIs used, geographical area of operation (e.g., shipping address, zip code, etc.), fraudulent activities, and so forth. Each fraudster may be associated with a fraud identifier that uniquely identifies a fraudster and allows the fraudster to be tracked.

The enrollment of speaker models into a fraudster database uses one or more precursor fraud databases. A precursor fraud database may be seeded with audio samples and associated audio sample identifiers collected without regard to fraudulent activity associated with the audio samples. The audio sample identifiers may be matched with identifiers in a fraud report. Speaker models extracted from audio in the precursor fraud database that is associated with the matched audio sample identifiers may be enrolled into the fraudster database. In various embodiments, the audio sample identifiers include any type of information that links the audio signal with at least one of a speaker identity, a customer account, and/or a communications device, such as a cellular telephone, a landline, or computing system that communicates via VoIP protocols. Information for a communications device may include data such as ANI, IMEI, caller identification, and so forth. As will be discussed below, channel models extracted from audio in the precursor fraud database that is associated with the matched audio sample identifiers may be enrolled into the fraudster database in a manner similar to speaker models.

In some embodiments, call data for call events is stored in a precursor database for enrollment into a fraudster database, see, e.g., U.S. patent application Ser. Nos. 11/404,342, 11/754,975 and 12/856,037, which are all hereby incorporated by reference herein in their entirety.

Figure 2A:
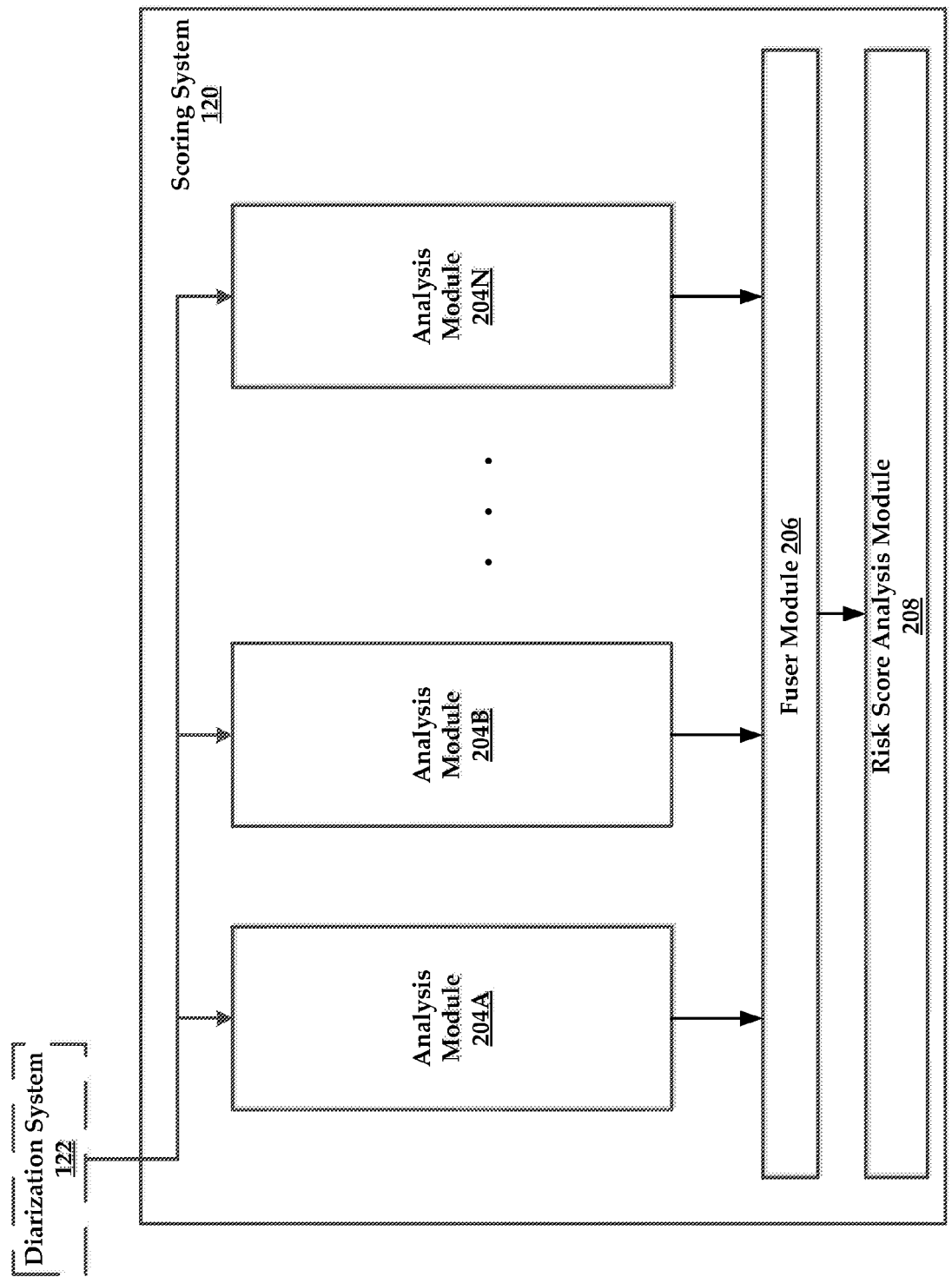
FIG. 2A is a block diagram illustrating details of the scoring system, in accordance with embodiments of the invention.

FIG. 2A is a block diagram illustrating details of the scoring system 120, in accordance with embodiments of the invention. The scoring system 120 includes two or more analysis modules, such as analysis modules 204A-N, a fuser module 206, and a risk score analysis module 208. The scoring system 120 is configured to generate fused risk scores, e.g., using fuser module 206, from match scores generated by various components of the system 120 such as analysis module 204A-N. The scoring system is further configured to generate the fused risk scores for use in detecting fraud, e.g., using risk score analysis module 208. In some embodiments, the scoring system 120 is a stand alone system configured to provide the fused risk scores. Alternatively, the scoring system 120 is a module of another system, e.g., the call center 100.

It is noteworthy that the system 120 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational module circuit, and/or other suitable components that provide the described functionality. In other embodiments, individual modules of the system 120 may include separately configured web servers.

In some embodiments, the system 120 may be implemented in a cloud computing environment. Generally speaking, a cloud computing environment or "cloud" is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo™; or such systems may be accessible to outside users who deploy applications within the computing infrastructure to obtain the benefit of large computational or storage resources.

The cloud may be formed, for example, by a network of servers with each server providing processor and/or storage resources. These servers may manage workloads provided by multiple users (e.g., cloud resource customers or other users). Typically, each user may place workload demands upon the cloud that vary in real-time, sometimes dramatically. The nature and extent of these variations typically depends on the type of business associated with the user.

The present technology leverages the computational resources of distributed computing (e.g., cloud computing systems) to facilitate efficient diarization and risk scoring of call audio data.

A portion (or potentially all portions) of system 120 may be integrated into FDS 102, while in other embodiments, the constituent sub-modules/components of the system 120 may be remotely distributed from one another in a remote computing arrangement, wherein each of the modules may communicate with one another via the Internet 106 utilizing any one (or combination) of a number of communications protocols or communications mechanisms (e.g., API, HTTP, FTP, etc.). It is envisioned that while the system 120 may be integrated within the FDS 102, in some embodiments, the system 120 may function as a stand-alone risk score fusing system that may be utilized by an enterprise, separate from the FDS 102.

Call data may be received by the diarization system 122 from any one or more originating sources, such as file transfer server 118, or may be received directly from callers 104 (see FIG. 1). Again, the call data may include not only voice data, but also channel data, and other data associated with the voice data and the channel data.

The system 120 may receive the diarized audio signals from the diarization system 122 as recorded data or streamed data. Upon receiving call data, the diarization system 122 may diarize the call data into one or more legs. It will be understood that a leg of call data may include segments comprising voice data, channel data, and metadata for a unique speaker. In some embodiments, a diarization system may be associated with the call center 100, and the system 120 may receive diarized call data from the enterprise.

Alternatively, the call center may record incoming call data (also referred to as the calling leg) and the outgoing call data (also referred to as the called leg) separately from one another, as well as separately from additional calling legs, for example as might be present in a conference call. Each of the two or more separate legs of call data may be stored and transmitted or optionally streamed to the FDS 102. Any of the separately recorded calling legs may include more than one voice. For example, agent 1 in the called leg may ask agent 2 in the called leg to speak with the caller on the calling leg. The two or more separate calling legs may be provided directly to the scoring system 120, bypassing the diarization system 122.

Once the call data has been diarized or separated, the diarized call data (also known as legs of call data) for one or more unique speakers are then provided to an analysis module, such as analysis module 204A. While any number of analysis modules may be utilized, the functionalities of the analysis modules 204A-N are substantially similar. Therefore, for the purposes of brevity, the analysis modules 204A-N will hereinafter be referred to as analysis module 204A. It is noteworthy that the number of analysis modules included in the system 120 may correspond to the number of legs that have been diarized from the call data. This allows for parallel processing of each of the legs, rather than sequential processing with a single analysis module. Alternatively, multiple analysis modules 204A-N may be configured as a single module that is used to generate matches of multiple legs of call data, processing each leg or portions of each leg using time-share or time slice techniques.

Figure 2B:
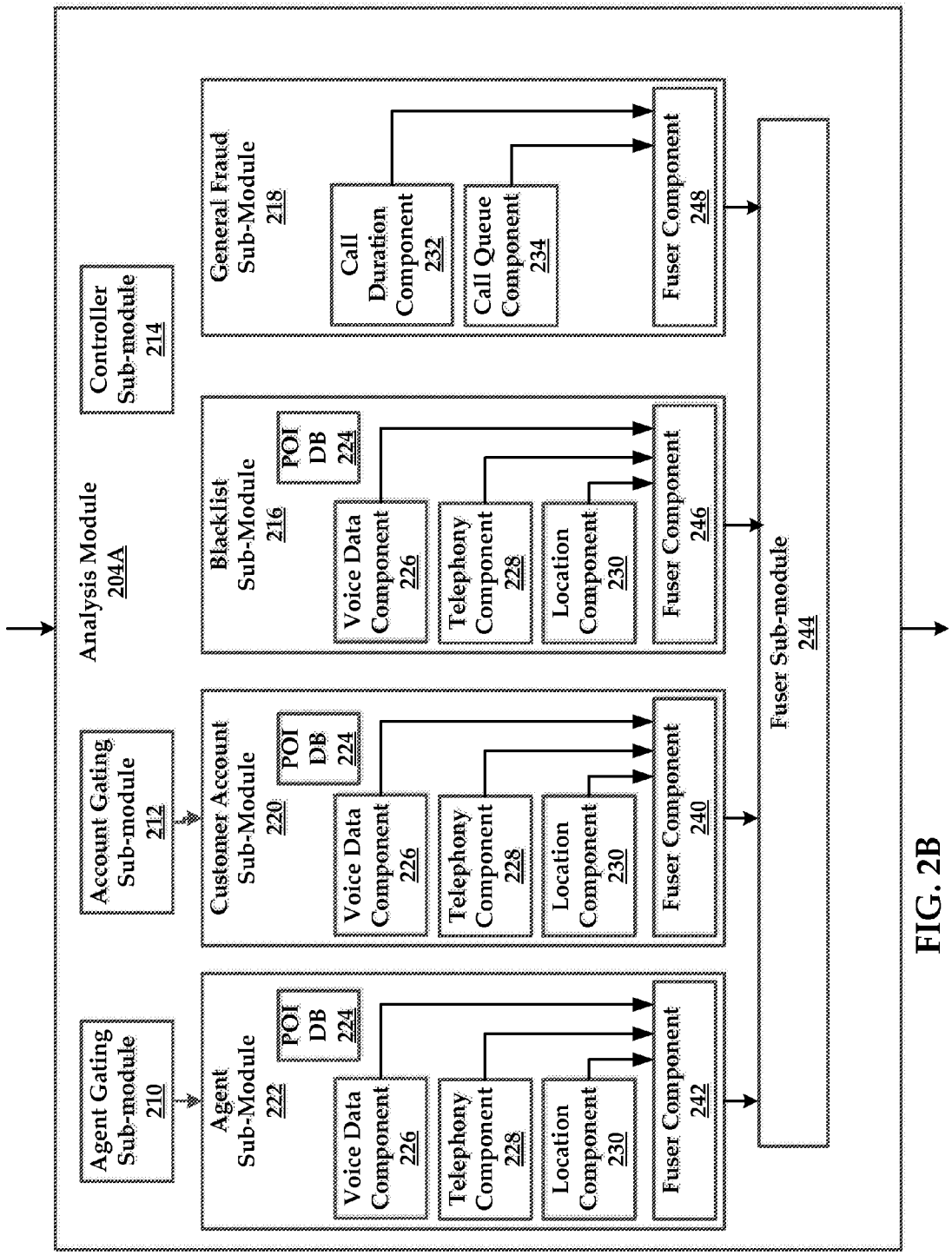
FIG. 2B is a block diagram illustrating details of an exemplary analysis module, in accordance with embodiments of the invention.

FIG. 2B is a block diagram illustrating details of an exemplary analysis module 204A, in accordance with embodiments of the invention. According to some embodiments, the analysis module 204A comprises a controller sub-module 214, an agent gating sub-module 210 an account gating sub-module 212, a customer account sub-module 220, and an agent sub-module 222, a blacklist sub-module 216, a general fraud sub-module 218 and a fuser sub-module 244. One or more of these modules may be omitted while remaining within scope of the invention. It is noteworthy that the analysis module 204A may include additional modules, engines, or components, and still fall within the scope of the present technology.

The controller sub-module 214 may determine the order in which a leg of call data is provided to the various sub-modules and modules of the analysis module 204A. The leg of call data may be provided to combinations of the agent sub-module 222, the customer account sub-module 220, the blacklist sub-module 216 and the general fraud sub-module 218 for processing. The controller sub-module 214 may cooperate with the agent gating sub-module 210 and/or the account gating sub-module 212 in determining the module and/or sequence for providing the leg of call data to the agent sub-module 222, the customer account sub-module 220, the blacklist sub-module 216 and the general fraud sub-module 218

The agent gating sub-module 210 may be used to determine if the leg of data is to be analyzed using the agent sub-module 222. In some instances, when a leg of call data is received by the analysis module 204A, the leg may be compared against the agent models database by the agent gating sub-module 210 to determine if the leg corresponds to an agent. That is, if metadata associated with an agent is included in the leg, use of the agent sub-module 222 may be precluded to optimize further analysis of the leg. On the other hand, if the leg does not include agent identification metadata, the agent sub-module 222 may be accessed if necessary, to determine if the leg is associated with an agent, for example, by comparing voice data of the leg to voice data associated with agents.

The account gating sub-module 212 operates in a different manner than in the agent case. If the customer-account is known, a customer speaker-model (for example in a whitelist) can be found. The customer account sub-module 220 may then generate a match score for that customer, using, for example a whitelist.

Additionally, if the leg of call data is associated with a potentially new account, it can be inferred that no customer account information can be determined. The customer account sub-module 220 may be used to find a match to determine if another customer (e.g., a previous undetected fraudster, a current customer by mistake, etc.) is trying to open a new account. Otherwise, the customer account sub-module 220 may be employed to determine a customer account associated with the leg of call data, such as when a speaker states a name, account number, or other identifying information such as account metadata that may be included in the leg (e.g., customer account information may be input by a caller via a telephone keypad).

The agent sub-module 222 is configured to receive as input a call data leg (which includes agent data) and generate as output an agent match score indicating a likelihood that a leg call data corresponds to an agent. The agent sub-module 222 includes person of interest (POI) database 224, a voice data component 226, telephony component 228, location component 230 and a fuser component 242. Each of the components may be omitted or used. In some embodiments, additional components are used. Other components such as a channel component may also be used in addition or instead of one of the above components. The following example is to illustrate an example of algorithms and functions that may be employed for generating an agent match score. However, the agent sub-module 222 may employ other algorithms and/or functions and still remain with embodiments of the invention.

The agent sub-module 222 may select a set or subset of agent models from the POI database 224. For example, the agent sub-module may select a set of ten agent models. The voice data component 226 is configured to generate an agent voice match score for each agent speaker model in the set. For example, the voice data component 226 may generate the following agent voice match score list or array:

| 0 | 0 | 1 | 3 | 8 | 0 | 2 | 1 | 1 | 4 |
|---|---|---|---|---|---|---|---|---|---| for agent 1-10, respectively.

Similarly, the telephony component 228 is configured to generate an agent telephony match score for telephony data against each agent model in the set. An example of a telephony match list or array is:

| 2 | 3 | 1 | 4 | 9 | 2 | 5 | 1 | 2 | 1 |
|---|---|---|---|---|---|---|---|---|---| for agent 1-10, respectively.

Similarly, the location component 230 is configured generate an agent location match score for location data against each agent model in the set. An example of a location match list or array is:

| 2 | 5 | 3 | 4 | 7 | 8 | 1 | 0 | 3 | 7 |
|---|---|---|---|---|---|---|---|---|---| for agent 1-10, respectively.

The fuser component 242 may generate an agent match score based on the three sets of agent scores according to a predetermined algorithm. An example is to determine an average for each agent match score for each of the three components. That is, the first entry of the voice match score array, the telephony match score array, and the location match score array (0,2,2) respectively may be averaged as (0+2+2)/3=1.3. Similarly the second through tenth entries in the respective voice match score array, the telephony match score array, and the location match score array may be averaged to yield the following example array:

| 1.3 | 2.7 | 1.7 | 3.7 | 8.0 | 3.3 | 2.7 | 0.7 | 2.0 | 4.0 |
|---|---|---|---|---|---|---|---|---|---|

The fuser component 242 of the agent sub-module 222 may then select the maximum average score, i.e. 8.0 as representing the likelihood that an agent in the set corresponds to the call leg. Thus, the agent match score for the received leg of call data and set of agent data is 8.0. Other functions and/or algorithms may be used to process the agent data and generate a match score. While a set of ten agents is used for illustration purposes, more or fewer agents may be included in the set.

The customer account sub-module 220 is configured to receive as input a call data leg (which includes non-audio call data such as the customer account number) and generate as output an account match score indicating a likelihood that a leg call data corresponds to an account holder. The account sub-module 220 includes a POI database 224, a voice data component 226, telephony component 228, location component 230 and a fuser component 242. In some embodiments, more components are used. Each of the components may be omitted or used. In the case of an unknown account, e.g., a new account, the same or similar algorithm may be used as described above for the agent sub-module 222. The account sub-module 220 may select as input a set comprising many accounts. The white list may be stored in the POI database 224. The account sub-module 220 may select the set of accounts, for example, from a whitelist in the POI database 224. Alternatively, the account number may be known. The account number may be associated with one or more speakers. In such case, the account sub-module 220 may select as input a set comprising the known one or more account holders associated with the account. In either case, the above algorithm and functions described above for the agent sub-module may be used to determine the likelihood that the leg of call data is associated with one of the account holders. The following example is intended to illustrate another example of algorithms and functions that may be employed for generating an account match score for an account including two account holders. However, the account sub-module 220 may employ other algorithms and/or functions and still remain with embodiments of the invention.

The account sub-module 220 may select a set or subset of account models from the POI database 224. For example, the account sub-module may select a set of models for two account holders. The voice data component 226 is configured to generate an account voice match score for each account speaker model in the set. For example, the voice data component 226 may generate an account voice match score list of

| 1 | 5 |
|---|---| for account holders 1-2, respectively.

Similarly, the telephony component 228 is configured to generate an account telephony match score for each account holder model (or account holder speaker model) in the set. An example of a telephony match is

| 2 | 9 |
|---|---| for account holders 1-2, respectively.

The location component 230 may be ignored or not used. For example, the customer account sub-module 220, the account gating sub-module 212 and/or the controller sub-module 214 may set a flag to skip the location component 230.

The fuser component 240 may generate an account match score based on the two sets of account holder scores according to a predetermined algorithm. An example is to determine an average for account match scores for each of the two holders of the account, e.g.,

| 1.5 | 7.0 |
|---|---|

The fuser component 240 may then select the maximum average score, i.e. 7.0 as representing the likelihood that an account in the set corresponds to the call leg. Thus, the account match score for the received leg of call data and set of account data in this example is 7.0. The account match score may be provided to the fuser sub-module 244. Other functions and/or algorithms may be used to process the account data and generate a match score.

The blacklist sub-module 216 is configured to receive as input a call data leg, and generate as output a fraudster match score indicating a likelihood that a leg call data corresponds to a fraudster in the blacklist. The blacklist sub-module 216 includes a POI database 224, a voice data component 226, telephony component 228, location component 230 and a fuser component 246. In some embodiments, more components are used. Each of the components may be omitted or used. The following example is to illustrate an example of algorithms and functions that may be employed for generating a fraudster match score. However, the blacklist sub-module 216 may employ other algorithms and/or functions and still remain with embodiments of the invention.

The blacklist sub-module 216 may store a blacklist in the POI database 224. The blacklist sub-module 216 may select as input a set or subset of models in the blacklist. For example, the blacklist sub-module 216 may select a set of models for hundreds, thousands, tens of thousands, hundreds of thousands, millions or more fraudsters. However, for illustration purposes, a set of ten fraudsters in used in this example. The voice data component 226 is configured to generate a fraudster voice match score for each fraudster speaker model in the set of selected fraudster data. For example, the voice data component 226 may generate an fraudster voice match score list or array of

| 2 | 2 | 1 | 1 | 2 | 3 | 3 | 2 | 1 | 4 |
|---|---|---|---|---|---|---|---|---|---| for fraudsters 1-10, respectively.

Similarly, the telephony component 228 is configured to generate a fraudster telephony match score against each fraudster model in the set. An example of a telephony match list or array is

| 0 | 0 | 1 | 2 | 0 | 2 | 1 | 1 | 2 | 2 |
|---|---|---|---|---|---|---|---|---|---| for fraudsters 1-10, respectively.

Similarly, the location component 230 is configured generate a fraudster location match score for location data against each fraudster model in the set. An example of a telephony match list or array is

| 1 | 1 | 2 | 1 | 1 | 2 | 1 | 1 | 2 | 0 |
|---|---|---|---|---|---|---|---|---|---| for fraudsters 1-10, respectively.

The fuser component 246 may generate a fraudster match score based on the three sets of fraudster scores according to a predetermined algorithm. An example is to determine an average for fraudster match scores for each of the three components, e.g.,

| 1 | 1 | 1.3 | 1.3 | 1 | 2.3 | 1.7 | 1.3 | 1.7 | 2.0 |
|---|---|---|---|---|---|---|---|---|---|

The fuser component 246 may then select the maximum average score, i.e. 2.3 as representing the likelihood that a fraudster in the set corresponds to the call leg. Thus, the fraudster match score for the received leg of call data and set of fraudster models is 2.3. Other functions and/or algorithms may be used to process the blacklist data and generate a match score. While a set of ten fraudsters is used for illustration purposes, more or fewer fraudsters may be included in the set.

Generally speaking, the general fraud sub-module 218 may compare the leg of call data to one or more types of speaker agnostic fraud data. Examples of speaker agnostic fraud data include call duration, where calls generated by fraudsters may have similar call durations. Likewise, calls received by certain call queues may be more closely associated with fraudsters. For example, inbound call queues that are dedicated to modifying existing customer account information may be frequently targeted by fraudsters attempting to gain control of customer accounts by manipulating customer account information.

According to some embodiments, the general fraud sub-module 218 may include a call duration component 232 that compares the leg of call data to call duration data associated with fraudsters and generates a call duration risk score based upon the comparison. Also, the general fraud sub-module 218 may include a call queue component 234 that compares the leg of call data to call queue data associated with fraudsters and generates a call queue risk score based upon the comparison. The general fraud sub-module 218 may include additional components that compare the leg of call data to other types of speaker agnostic fraud data.

The general fraud sub-module 218 is configured to receive as input a call data leg and general fraud parameters for call duration and call queue. The general fraud sub-module 218 is further configured to generate as output a general fraud match score indicating a likelihood that a leg call data corresponds to fraud. The general fraud sub-module 218 of FIG. 2B includes the call duration component 232, the call queue component 234, and the fuser component 248. The following example is intended to illustrate an example of algorithms and functions that may be employed for generating a general fraud match score. However, the general fraud sub-module 218 may employ other algorithms and/or functions and still remain with embodiments of the invention. The general fraud sub-module 218 may select as parameters for the call duration component 232 and/or the call queue component 234 values based on data from the agent sub-module 222, the customer account sub-module 220 and/or the blacklist sub-module 216.

The call duration component 232 may generate a duration match score using parameters and algorithms installed in the component. For example, the call duration component 232 may generate a duration match score of 8. Similarly, the call queue component 234 may generate a queue match score using parameters and algorithms installed in the component. For example, the call queue component 234 may generate a queue match score of 5. It is noteworthy that the general fraud module may receive inputs on a per-call basis, not just a per-leg basis. In various embodiments, the call duration component 232 and/or the call queue component 234 may be used to match an entire call or a call leg or a segment of a call leg.

The fuser component 248 may then calculate an average score, i.e. 6.5 as representing the likelihood that the call leg is related to fraud. Thus, the general fraud match score for the received leg of call data is 6.5. The general fraud match score may be provided to the fuser sub-module 244. Other functions and/or algorithms may be used to process the general fraud data and generate a match score.

Generally speaking, each of the modules described above may be adapted to generate unique match scores for each comparison between call leg data and respective sub-module models. Each comparison may be expressed as a numeric value, (e.g., between 1 and 10) indicating a degree of a match. The number may represent either a higher or lower fraud risk depending on sub-module. For example, in the case of the blacklist sub-module 216 and the general fraud sub-module 218 (fraudster match score and fraud match score, respectively), a higher number indicates a higher risk of fraud or fraud score. On the other hand, in the case of the agent sub-module 222 and the customer account sub-module 220 (agent match score and account match score, respectively), a higher match score indicates a lower risk of fraud or fraud score.

For example, speaker characteristics/features for a leg of call data may be compared to a speaker model for a fraudster. If the match score for the leg is 9 when compared to the speaker model for the fraudster, the risk score for the comparison may be relatively high. As a practical matter, scales used for representing a match are rather arbitrary and different scales may be used for each sub-module. In various embodiments the scales may be numeric, percentage, linear, logarithmic, digital, and/or the like. The scale of 1-10 is presented as an example for simplicity. Thus, for simplicity this application has adapted the convention that the match score is directly related to a match between the call data and data in a database, which may represent risk that either the call or call leg is related to fraud or confidence that the call data is not related to fraud. Further, for simplicity this application has also adapted the convention that the risk score is directly related to a risk that the call data relates to fraud.

In some embodiments, the voice data component 226 compares channel data of the leg of call data to channel models associated with fraudsters and generates a channel data risk score based upon the comparison. For example, the voice data component 226 may choose a set of available fraudster channel models (e.g., for 200 fraudsters) and generates one risk score per potential fraudster using a specified algorithm. In some embodiments, a channel data component (omitted for simplicity) may be included as a component of a sub-module such as the agent sub-module 222, the customer account sub-module 220, and/or the blacklist sub-module 216. Alternatively, the voice data component 226 is configured to perform a match using voice and/or channel data.

The telephony component 228 may compare the leg of call data to telephony data associated with fraudsters and generate a telephony match score based upon the comparison. For example, the telephony component 228 may compare the ANI from the call data to the ANIs associated with fraudsters and generate one match score per fraudster.

The location component 230 may compare the leg of call data to location data associated with fraudsters and generate a location risk score based upon the comparison. For example, the location component 230 may choose a set of locations associated with fraudsters (e.g., for 200 fraudsters) and generates one risk score per potential fraudster using a specified algorithm.

It is noteworthy that the blacklist sub-module 216 may include other suitable types of components that may be used to compare the leg of call data to information associated with fraudsters.

As with the other sub-modules that have been discussed elsewhere herein, other match scores may be generated by the components of the blacklist sub-module 216 and may be fused together by the fuser component 246. For example, an aggregate number of match scores generated by comparison of the call leg data with fraudster speaker models may be combined with an aggregate number of match scores generated by comparison of the call leg with fraudster channel models to create an aggregate fused match score value that is the sum of the speaker model match scores and the channel model match scores.

The fuser sub-module 244 is configured to generate a leg fused risk score. Input for the fuser sub-module 244 may be any combination of the agent match score, the account match score, the fraudster match score, and/or the general fraud match score (from the agent sub-module 222, the customer account sub-module 220, the blacklist sub-module 216 and/or the general fraud sub-module 218, respectively). In one example, the fuser sub-module 244 calculates the leg fused risk score based on an average, such as relation:

$$\text{leg fused risk score} = (10-\text{agent} + 10-\text{account} + \text{fraudster} + \text{fraud})/4$$

Where:
agent=agent match score (10−agent may represent an agent risk score)
account=account match score (10−account may represent an account risk score)
fraudster=fraudster match score
fraud=fraud match score.
Referring to the example above, $$\text{leg fused risk score} = (10-8.0+10-7.0+2.3+6.5)/4 = 3.5$$

In another example, the fuser sub-module 244 calculates the leg fused risk score based on a weighted average, such as illustrated by the relation:

$$\text{leg fused risk score} = [A(10-\text{agent}) + B(10-\text{account}) + C(\text{fraudster}) + D(\text{fraud})]/4$$

Where: A, B, C, and D are weights which may be selected or determined using training techniques.

The fuser module 206 is configured to generate a fused risk score from two or more legs of call data. Input for the fuser module 206 may be any combination of the legs A-N (analysis module 204A, analysis module 204B . . . analysis module 204N). In one example, the fuser module 206 calculates the per-call fused risk score based on an average of the leg fused risk scores, such as illustrated in the relation:

$$\text{risk score} = (\text{leg risk score } A + \text{leg risk score } B)/2$$

where leg risk scores are received from analysis module 204A and analysis module 204B. Assuming that leg risk score B=6.8 and referring to the above example:

$$\text{risk score} = (3.5+6.8)/2 = 5.2$$

While a simple average is illustrated above, the risk score from each of the legs may be weighted and the per-call fused risk score may be normalized. Other relations may be used, such as a polynomial, power, logarithmic, linear functions, non-linear functions, rule-based (e.g., business rules) analyses, table lookup functions, and combinations thereof. Various combinations of fusers 240-248 and/or 206 may be combined as a single module. For example, the fuser sub-module 244 and the risk score fuser module 206 may be combined as a single module. Similarly, the fuser components 240, 242, 246, and 248 may be combined as a single module. In some embodiments, the fusers 240-248 and 206 are combined as a single module.

Specific databases containing audio and non-audio models about a person of interest are used for illustration purposes. These may be represented using POI database 224. For example, in the agent sub-module 222, the POI database 224 for the voice component 226, the telephony component 228, and/or the location component 230 is an agent database. Similarly, in the customer account sub-module 220, the POI database 224 for the voice component 226, the telephony component 228, and/or the location component 230 is a whitelist database. Similarly, in the blacklist sub-module 216, the POI database 224 for the voice component 226, the telephony component 228, and/or the location component 230 is a blacklist or fraudster database. POI databases 224 for other persons of interest may be constructed for various sub-modules. For example, a POI database may be constructed for persons who are well known by the public and are often targets of fraudsters.

Generally speaking, the fuser module 206 may generate fused risk scores from two or more risk or match scores/values generated by any of a module, a sub-module, and/or a component described herein. In some instances, the fuser module 206 may normalize one or more of the match and/or risk scores generated by the two or more sub-modules to simplify the fusing of the risk scores together.

In some embodiments, a hierarchy of fusers 240-248 and 206 are used to perform fusing in a hierarchical manner. For example, in a first level of hierarchy, fuser components 240, 242, 246, and 248 may each receive match scores from components within the respective sub-modules 220, 222, 216, and 218. The fuser components 240, 242, 246, and 248 each generate a sub-module match score from the respective received match scores. In some embodiments, the fuser components 240, 242, 246, and 248 each generate a component match score from the respective received match scores and then generate a sub-module match score from the respective component match score. In the next level of hierarchy, fuser sub-module 244 is configured to receive sub-module match scores from fuser components 240, 242, 246, and 248, fuse the sub-module match scores, and generate a module risk score for a leg of call data. In the next level of hierarchy, the risk score fuser module 206 is configured to receive module risk scores from multiple fuser sub-modules 244 in multiple respective analysis modules 204A-204N. The risk score fuser module 206 is further configured to fuse the module risk scores received from the legs of call data and generate a fused risk score.

In fusing together various risk and/or match scores generated by the various modules and/or sub-modules, the fusers 240-248 and 206 may use one of a number (or combination) of algorithms, functions, or processes. For example, the fusers 240-248 and 206 may utilize linear functions, non-linear functions, rule-based (e.g., business rules) analyses, table lookup functions, and combinations thereof. Similarly, the voice data component 226, telephony component 228, location component 230, call duration component 232 and/or the call queue component 234 may utilize linear functions, non-linear functions, rule-based (e.g., business rules) analyses, table lookup functions, and combinations thereof for generating match scores.

Based upon the fraudster match score generated by the blacklist sub-module 216, the controller sub-module 214 may determine if the leg of call data should be processed by one or more additional sub-modules. For example, if the controller sub-module 214 determines that a fraudster match score indicates that the leg of call data more than likely belongs to a fraudster, the controller sub-module 214 may adjust weights, parameters, functions and database input used by one more of the agent sub-module 222, account sub-module 220, and/or the general fraud sub-module 218.

The fraud risk score calculated using the fuser module 206 may be provided to the analysis module 208. Based on the fraud risk score, the analysis module 208 may output an alert message. Possible output types generated by the risk score processor will be discussed in greater detail below.

Again, the controller sub-module 214 may determine if further processing is to be performed on the leg of call data. The leg of call data may be provided to the customer account sub-module 220 which determines if the leg of call data may be associated with a customer account. This comparison may include comparing the leg of call data to a whitelist of customers. In other instances, the customer account sub-module 220 may determine customer account information from metadata included in the leg, or by selecting keywords that correspond to customer account information. In some embodiments, the customer account sub-module 220 may utilize biometric speaker identification functions and/or ANI number matching to compare the ANI associated with the leg to ANIs associated with customer accounts.

By way of example, the customer account sub-module 220 may choose a set of account holders (e.g., if account identification is provided, this sub-module may lookup and select the specified account holders) associated with this account. The customer account sub-module 220 may generate a match score for each account. Likewise the ANI of each customer account may be compared to the ANIs determined from the leg of call data.

The match score generated for the accounts may be fused with the ANI match scores to generate an overall account-holder-score for each account holder.

In other embodiments, the leg of call data may be provided to an agent sub-module 222 which determines if the leg of call data is associated with one or more agents. Similarly to the customer account sub-module 220, the agent sub-module 222 may utilize biometric speaker identification functions to compare any of speaker data, channel data, and/or operational data of the leg of call data to speaker models, operational models, and/or channel models associated with agents. For example, the agent sub-module 222 may also utilize location-based matching to compare locations associated with agents to the location determined from the leg of call data.

The fuser sub-module 244 may fuse two or more match scores generated by at least two of the blacklist sub-module 216, the general fraud sub-module 218, the customer account sub-module 220, and the agent sub-module 222.

Analysis of the fused risk scores may be accomplished by execution of the risk score analysis module 208. The risk score analysis module 208 may employ any of a variety of functions for analyzing the risk score. The risk score analysis module 208 may generate reason codes which are associated with fused risk scores along with confidence values for fused risk scores. The confidence value may include a relative comparison of fused risk scores. For example, a confidence value may be calculated that represents a comparison between the blacklist fused match score and the account holder fused match score. A high confidence value that a leg is associated with a fraudster may be determined when the blacklist fused match score is relatively large compared to the account holder fused match score.

Other types of similar weighted analyses may be utilized by the risk score analysis module 208. Additionally, the risk score analysis module 208 may generate a plurality of different types of outputs. Exemplary output generated by the risk score analysis module 208 may comprise a single overall risk score per leg, confidence scores for fused risk scores, a reason code, multiple sub-module risk scores (could be fused risk scores) per leg, a list of reason codes, one per sub-module or component, and diarized audio of a leg and/or a diarization confidence for a leg.

In some embodiments, the risk score analysis module 208 may also update a database of call data with added entries/tags for score, reason code, and so forth. Additionally, a local database tool or a web-based tool can be used to query and view results (e.g., score, reason code, etc.) for one or more legs. The user of the tool can query by date range, score, etc. to select subset of legs.

In additional embodiments, the risk score analysis module 208 may generate and/or transmit generated alerts via CTI (Computer Telephony Integration), e-mail, IM (Instant Messenger), SMS (Short Messaging Service), custom API integration, and so forth. Alerts can be sent for each call as soon as a fused risk score is available. Alternatively, alerts can be sent in a batch periodically (e.g., asynchronously). In some instances, alerts can be sent for fused risk scores that exceed a threshold value. For example, if a blacklist fused risk score exceeds five an alert email may be provided to an agent associated with the call.

The following include possible actions that may be performed in response to receiving a fused risk score: send an alert indicative of risk, send an alert indicative of risk if a fused risk score exceeds a threshold value, send an alert indicative of risk if a fused risk score and its associated confidence value exceed thresholds, flag the call for further review, queue the call up for enrollment into a whitelist, queue the call for enrollment into a blacklist, place the leg of call data into a precursor database, accept a transaction associated with the call, deny a transaction associated with a call, combine a fused risk score with other (alternative) risk indicators (e.g. from other sources such as credit check, other fraud detection tools and systems), trigger a follow-up action such as asking the caller to provide further information and/or asking the caller to go into the retail branch/store to execute their transaction.

Figure 3:
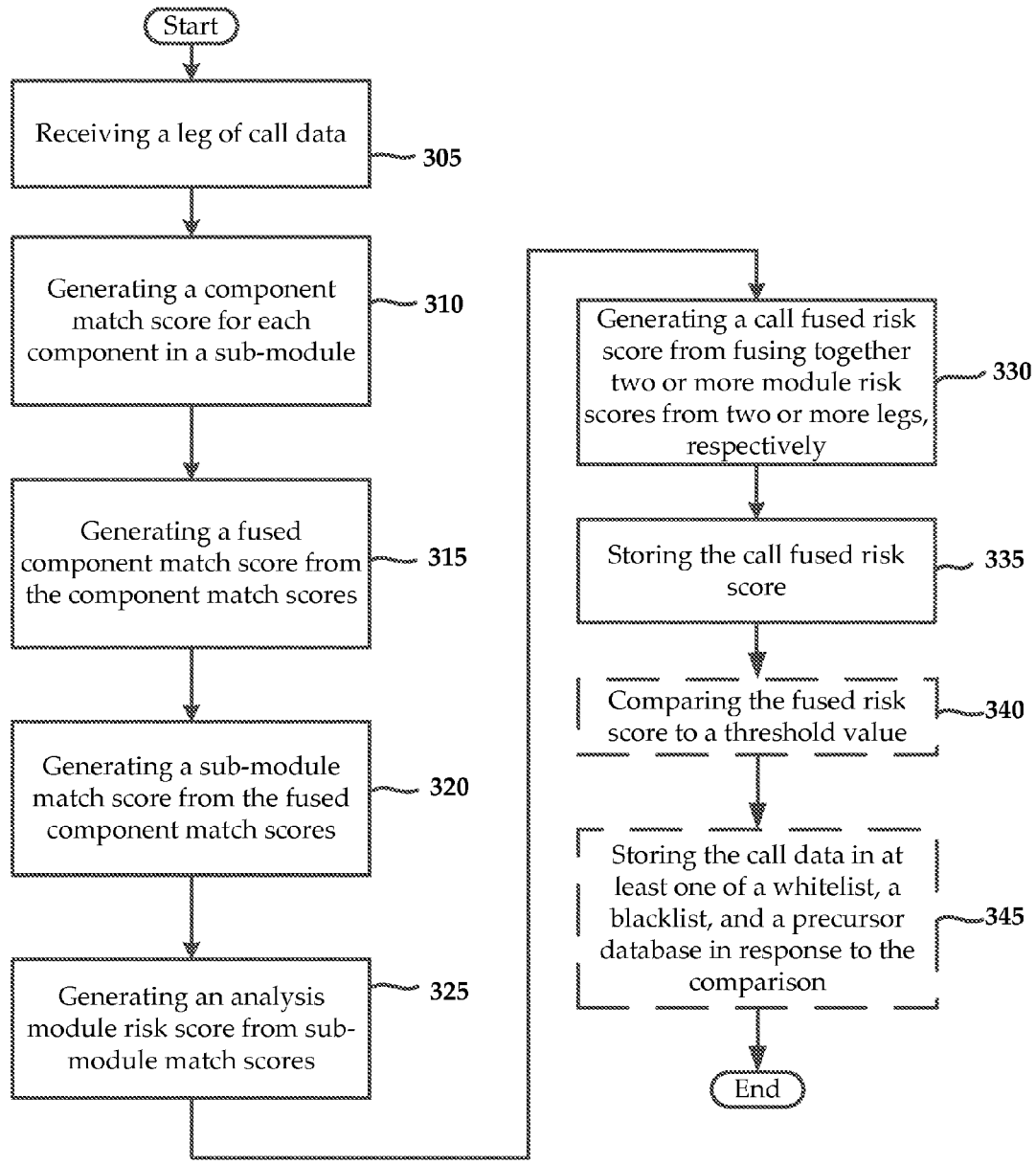
FIG. 3 shows a flowchart of an exemplary method for generating fused risk scores for call data.

FIG. 3 illustrates a flowchart of an exemplary method for generating a fused risk score for call data. The method may include a step 305 of receiving a leg call data. As mentioned previously, the call data may be received from a call center or directly from callers. A leg of call data may be recorded separately from other legs. Alternatively, call data may be diarized to separate legs of call data audio. In some embodiments, the received call data that has already been diarized into one or more call legs before being received.

The method may also include a step 310 of generating a component match score for each component in a sub-module. Examples of sub-modules for processing call data include an agent sub-module 222, a customer account sub-module 220, a blacklist sub-module 216, a general fraud sub-module 218, and/or the like. In various embodiments, the component match score is generated using components in the sub-modules including a voice data component 226, a telephony component 228, a location component 230, a call duration component 232, a call queue component 234, and/or the like. For example, the voice data component 226, the telephony component 228, and the location component 230 may generate the component match based on a comparison and match between the call data and information in a database of persons of interest (e.g., the POI database 224). Information in a POI database 224 includes metadata, voice models, channel models, and/or the like.

A step 315 comprises generating a fused component match score from the component match scores. The component match scores may be fused, e.g., using the fuser component 240, 242, 246, and 248 to generate fused component match scores. For example, in the blacklist sub-module 216, the fuser component 246 may fuse the component match scores from each of the voice data component 226, the telephony component 228, and the location component 230. The fuser component 246 may, for example, average the component match scores for the voice data component 226 with the telephony component 228 and the location component 230 for a first person of interest in the POI database 224 to generate a fused component match score. The fuser component 246 may likewise generate a second fused component match score for second person of interest the POI database 224. Similarly, the agent sub-module 222, the customer account sub-module 220, and the general fraud sub-module 218 may generate fused component match scores.

In a step 320, a sub-module match score is generated from the fused component match scores. For example, the fuser component 246 in the blacklist sub-module 216 may generate the sub-module match score from the first and second fused component match scores. The fuser component 246 may, for example, select the maximum fused component match score. Similarly, the agent sub-module 222, the customer account sub-module 220, and the general fraud sub-module 218 may generate sub-module match scores.

In a step 325, a module risk score is generated from the sub-module match scores. For example, the fuser sub-module 244 may receive sub-module match scores from the agent sub-module 222, the customer account sub-module 220, the blacklist sub-module 216, and the general fraud sub-module 218. The fuser sub-module 244 may, for example, average the sub-module match scores to generate the module risk score. The module risk score may represent a risk of fraud for the received leg of call data. Other legs may be analyzed in a similar manner to generate module risk scores for each leg.

In a step 330 two or more module risk scores are fused together from two or more legs, respectively. For example, each of multiple analysis modules 204A-N may generate a module risk score. A fuser module 206 may receive module risk scores from multiple legs and generate a call fused risk score based on the module risk scores.

Next, the method may include a step 335 of storing the call fused risk score in a storage device that is communicatively couplable with the scoring system 120. Alternatively, or in addition to storing the fused risk score, the method may include a step 340 of comparing the fused risk score to a threshold value, followed by a step 345 of storing the call data in at least one of a whitelist, a blacklist, and a precursor database in response to the comparison.

It will be understood that the method may include additional or fewer or steps that those listed above. Additionally, optional steps have been shown as dotted lined objects in the Figures.

Figure 4:
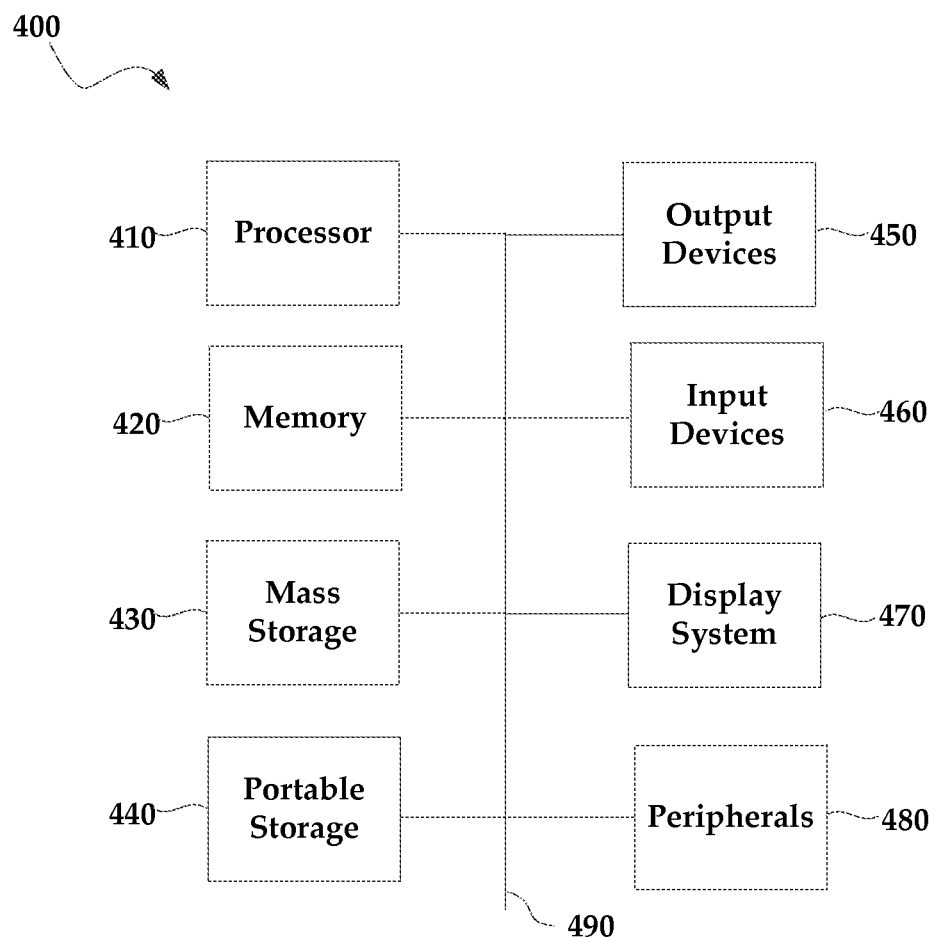
FIG. 4 illustrates an exemplary computing system that may be used to implement embodiments according to the present technology.

FIG. 4 illustrates an exemplary computing system 400 that may be used to implement an embodiment of the present technology. The computing system 400 of FIG. 4 may be implemented in the contexts of the likes of computing systems, clouds, modules, engines, networks, servers, and so forth. The computing system 400 of FIG. 4 includes one or more processors 410 and main memory 420. Main memory 420 stores, in part, instructions and data for execution by processor 410. Main memory 420 may store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 may store the system software for implementing embodiments of the present technology for purposes of loading that software into main memory 420.

Portable storage device 440 operates in conjunction with a portable non-volatile storage medium, such as a floppy disk, compact disk, digital video disc, or USB storage device, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computing system. Peripheral device(s) 480 may include a modem or a router.

The components provided in the computing system 400 of FIG. 4 are those typically found in computing systems that may be suitable for use with embodiments of the present technology and are intended to represent a broad category of such computer components that are well known in the art. Thus, the computing system 400 of FIG. 4 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While certain exemplary embodiments have been described and shown in the accompanying drawings, it is to be understood that such embodiments are merely illustrative and not restrictive of the broad disclosure and that this disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method for generating a fused risk score used to determine a likelihood of fraud from call data, the method comprising:
   receiving a first leg of call data;
   generating a first audio component match score for the first leg of the call data based on a comparison of audio data in the first leg with a first voice model in a fraudster database using a first component of a first sub-module;
   generating a first non-audio component match score for the first leg of the call data based on a comparison of non-audio data in the first leg with a first non-audio data in the fraudster database using a second component of the first sub-module;

fusing together the first audio component match score and the first nonaudio component match score using a first fuser component to generate a first fused component match score;

determining the fused risk score based on the first fused component matchscore using a risk score fuser module;

determining the likelihood of fraud from the fused risk score;

fusing together the first sub-module match score and a second sub-module match score using a first fuser sub-module to generate a first module risk score for the first leg of the call data; and receiving a second leg of call data and fusing together the first module risk score and a second module risk score from the second leg of the call data using the risk score fuser module to generate a call fused risk score.

2. The method according to claim 1, further comprising:

generating a second audio component match score for the first leg of the call data based on a comparison of the audio data in the first leg with a second voice model in the fraudster database using the first component of a first sub-module;

generating a second non-audio component match score for the first leg of the call data based on a comparison of the non-audio data in the first leg with a second non-audio data in the fraudster database using the second component of the first sub-module; and fusing together the second audio component match score and the second non-audio component match score using the first fuser component to generate a second fused component match score.

3. The method according to claim 2, further comprising fusing together the first fused component match score and the second fused component match score using the first fuser component to generate a first sub-module match score.

4. The method according to claim 3, wherein fusing together the first fused component match score and the second fused component match score comprises selecting the maximum value.

5. The method according to claim 1, wherein fusing together the first submodule match score and the second sub-module match score comprises calculating a weighted sum including the first sub-module match score and the second sub-module match score.

6. The method according to claim 1, wherein fusing together the first audio component match score and the first non-audio component match score comprises calculating a weighted average value.

7. The method according to claim 1, further comprising comparing the fused risk score to a threshold value and generating a likelihood of fraud based upon the comparison.

8. The method according to claim 7, further comprising fusing together each of the fused risk scores for each leg to generate a fused risk score for the call data.

9. The method according to claim 1, further comprising comparing the fused risk score to a threshold value and generating an output based upon the comparison.

10. The method according to claim 9, wherein the output comprises any of an alert message, a reason code, the fused risk score, one or more uniquely calculated fraud risk scores generated by one or more sub-modules, one or more legs of call data, a diarization score, and combinations thereof.

11. A system for generating a fused risk score from call data, the system comprising:

a memory for storing executable instructions;
a processor for executing the instructions;

a first blacklist sub-module configured to receive a first leg of call data, the first blacklist sub-module including:
  a voice data component configured to generate a blacklist voice match score based on a comparison of voice call data and a speaker model in a fraudster database;
  a non-audio data component configured to generate a blacklist nonaudio match score based on a comparison of non-audio call data and a fraudster non-audio model in the fraudster database, the fraudster non-audio model related to the fraudster speaker model;
  a blacklist fuser component communicatively coupled to the voice data component and the non-audio data component and configured to fuse the blacklist voice match score and the
  blacklist non-audio match score and output a blacklist match score;

a first whitelist sub-module configured to receive the first leg of the call data, the first whitelist sub-module including:
  a voice data component configured to generate a whitelist voice match score based on a comparison of voice call data and a speaker model in a whitelist database;
  a non-audio data component configured to generate a whitelist non-audio match score based on a comparison of non-audio call data and a whitelist non-audio model in a whitelist database the whitelist non-audio model related to the whitelist speaker model;
  a whitelist fuser component communicatively coupled to the voice data component and the non-audio data component and configured to fuse the whitelist voice match score and the whitelist non-audio match score and output a whitelist match score;

a first fuser sub-module configured to fuse the blacklist match score and whitelist match score for the first leg of the call data and generate a first leg risk score;

a second blacklist sub-module configured to receive a second leg of call data, the second blacklist sub-module including:
  a voice data component configured to generate a blacklist voice match score based on a comparison of voice call data and a speaker model in the fraudster database;
  a non-audio data component configured to generate a blacklist nonaudio match score based on a comparison of non-audio call data and fraudster non-audio model in the fraudster database, the fraudster non-audio model related to the fraudster speaker model;
  a blacklist fuser component communicatively coupled to the voice data component and the non-audio data component and configured to fuse the blacklist voice match score and the blacklist non-audio match score and output a blacklist match score;

a second whitelist sub-module configured to receive the second leg of the call data, the second whitelist sub-module including:
  a voice data component configured to generate a whitelist voice match score based on a comparison of voice call data and a speaker model in a whitelist database;
  a non-audio data component configured to generate a non-audio match score based on a comparison of non-audio call data and a whitelist non-audio model in a whitelist database the whitelist non-audio model related to the whitelist speaker model;
  a whitelist fuser component communicatively coupled to the voice data component and the non-audio data component and configured to fuse the whitelist voice match score and the whitelist non-audio match score and output a whitelist match score;

a second fuser sub-module configured to fuse the blacklist match score and whitelist match score for the second leg of the call data and generate a second leg risk score; and a risk score fuser module configured to fuse the first leg risk score and the second leg risk score.

12. The system according to claim 11, further comprising a general fraud submodule configured to compare the call data to speaker agnostic fraud data and generate a general fraud match score based upon the comparison.

13. The system according to claim 11, wherein the blacklist voice match score is an array.

14. The system according to claim 11, wherein the blacklist non-audio match score is an array.

15. The system according to claim 11, further comprising a diarization module configured to separate the first leg of call data and the second leg of call data.

16. The system according to claim 11, further comprising;
a first general fraud sub-module including:
   a call duration component configured to compare a duration of the first leg of call data to a model of call durations associated with fraudsters and generate a call duration match score based upon the comparison;
   a call queue component configured to compare the first leg of call data to a model of call queue behavior associated with fraudsters and generate a call queue match score based upon the comparison; and
   a general fraud fuser component configured to fuse the call duration match score and the call queue match score and generate the first leg general fraud risk score, the first fuser sub-module further configured to fuse the first leg general fraud; and
a second general fraud sub-module including:
   a call duration component configured to compare a duration of the second leg of call data to a model of call duration behavior associated with fraud and generate a call duration match score based upon the comparison;
   a call queue component configured to compare the second leg of call data to a model of call queue behavior associated with fraud and generate a call queue match score based upon the comparison; and
   a general fraud fuser component configured to fuse the call duration match score and the call queue match score and generate the second leg general fraud risk score, the second fuser module further configured to fuse the second leg general fraud.

17. The system according to claim 11, further comprising a first general fraud sub-module including:
   a call duration component configured to compare a duration of the first leg of call data to a model of call durations associated with fraudsters and generate a call duration match score based upon the comparison;
   a call queue component configured to compare the first leg of call data to a model of call queue behavior associated with fraudsters and generate a call queue match score based upon the comparison; and
   a general fraud fuser component configured to fuse the call duration match score and the call queue match score and generate the first leg general fraud risk score, the first fuser module further configured to fuse the first leg general fraud.

18. The system according to claim 11, further comprising a risk score analysis module that compares the fused risk score to a threshold value and generates an output based upon the comparison.

19. The system according to claim 18, wherein the output comprises any of an alert message, a reason code, the fused risk score, one or more uniquely calculated fraud risk scores generated by one or more sub-modules, the leg of call data, a diarization score, and combinations thereof.

* * * * *